Patented Dec. 3, 1929

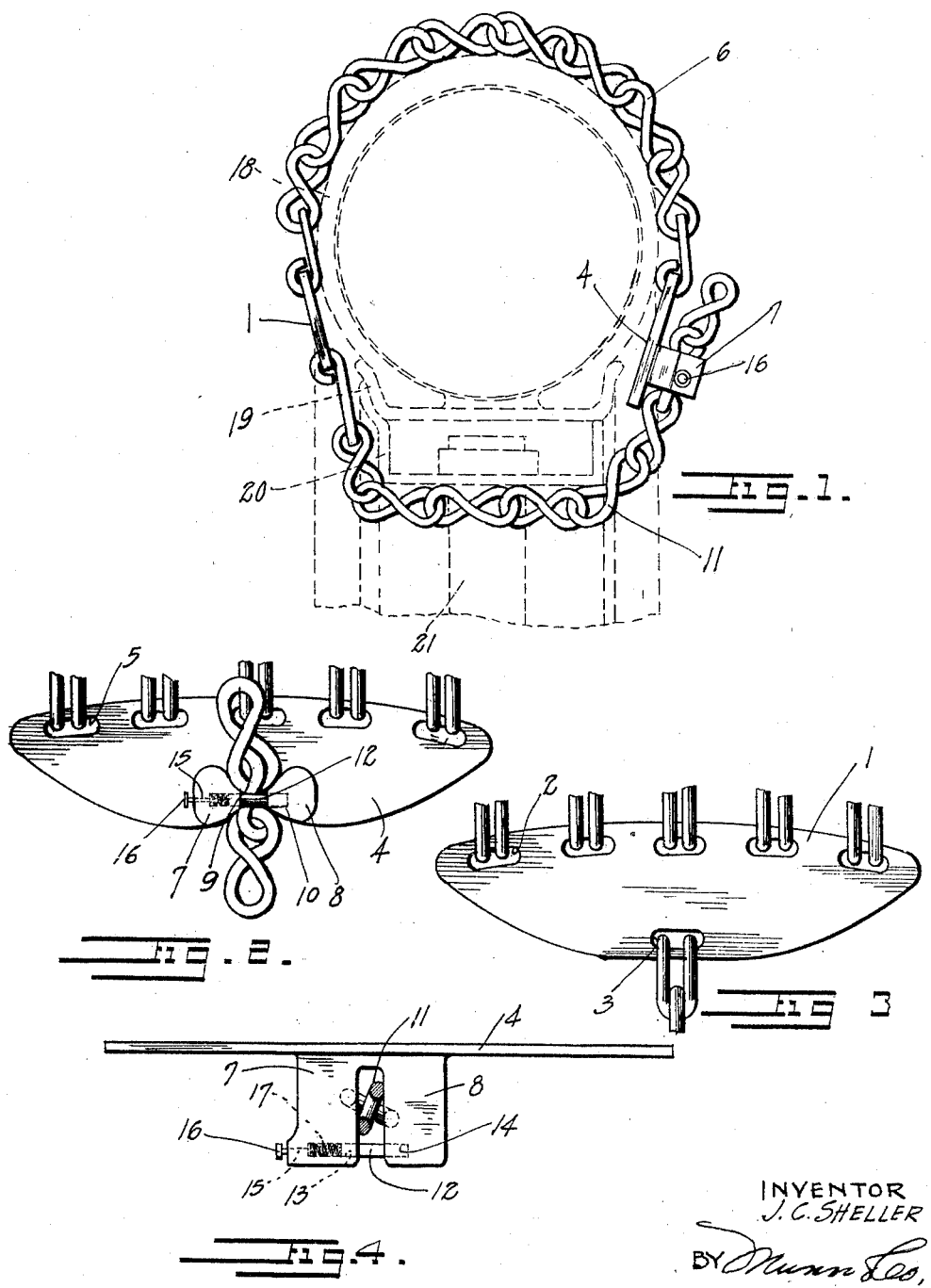

1,738,453

UNITED STATES PATENT OFFICE

JOHN C. SHELLER, OF MAYWOOD, ILLINOIS, ASSIGNOR TO WALTER B. HINTZE, OF CHICAGO, ILLINOIS

ATTACHMENT FOR VEHICLE WHEELS

Application filed February 6, 1928. Serial No. 252,240.

My invention relates to improvements in attachments for vehicle wheels, and it consists in the combinations, constructions, and arrangements herein described and claimed.

An object of my invention is to provide an attachment for vehicle wheels which may be readily attached to a vehicle tire and wheel for preventing skidding upon slippery streets or to provide a positive means whereby the vehicle upon which the device is attached may be removed from a mud hole, rut, or the like, due to the positive gripping contact with the ground.

A further object of my invention is to provide a device of the type described which may be readily and positively secured to vehicle wheels and tires of various sizes.

A further object of my invention is to provide a device of the type described which provides a positive attachment independent of the size or condition of the vehicle tire.

A further object of my invention is to provide a device of the type described which is simple in construction, durable, and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a sectional view of a vehicle tire and wheel with my device applied thereto, Figure 2 is a front elevation of one portion of my device, Figure 3 is a front elevation of another portion of my device, and Figure 4 is a top plan view of that portion shown in Figure 2.

In carrying out my invention, I provide an inner retaining member or plate 1 having a plurality of elongated openings 2 disposed in an arcuate-shaped position at spaced-apart points substantially adjacent one edge thereof. An additional elongated opening 3 is provided at substantially the center of the opposite edge of the plate 1.

A securing member or other plate 4 is provided with a plurality of elongated openings 5 which are disposed in an arcuate-shaped position at spaced-apart points substantially adjacent one edge thereof. A plurality of friction chains 6 is disposed in parallel relation and have their ends secured to the retaining member 1 at the openings 2 and to the securing member 4 at the openings 5.

Retaining arms 7 and 8 are carried by the securing member 4. The arms 7 and 8 taper inwardly to relatively narrow portions 9 and 10, respectively, for a purpose hereinafter described. A securing chain 11 has one end secured to the retaining member 1 at the opening 3. A retaining pin 12 is receivable in openings 13 and 14 in the arms 7 and 8, respectively. The pin 12 is provided with a reduced portion 15 which has a knob or handle 16 secured to the outer end thereof. A compression spring 17 is disposed concentric with the reduced portion 15 within the opening 13 and is arranged to normally hold the outer end of the pin 12 within the opening 14.

From the foregoing description of the various parts of the device, the operation thereof may be readily understood. To place the device upon a tire, the retaining member is placed upon the inside; i. e., that side of the tire nearest the frame of the automobile, and the securing member 4 is placed upon the outside of the tire in a position so that the arms 7 and 8 will project outwardly away from the tire. I have shown a tire indicated at 18 which is mounted upon a rim 19, the rim in turn being mounted upon a felly 20 of a wheel 21. In this manner, the friction chains 6 extend over the tread of the tire, as shown in Figure 1, and the securing chain 11 is suspended from the retaining member 1 upon the inner side of the wheel.

The user may then, by reaching through the wheel, bring the free end of the securing chain 11 beneath the felly 20. By holding the securing plate 4 against displacement, the chain 11 may be drawn taut and the link of the chain 11 adjacent the arms 7 and 8 forced therebetween. The reduced portions 9 and 10 of the arms 7 and 8 make it possible for the link of the chain 11 to pass therebetween, as shown in Figure 2. It will be observed that, due to the shape of the links, the link between the arms 7 and 8 will be held against rotative movement. Therefore, the link positioned above the arms 7 and 8 will engage with the upper tapered surfaces thereof and will hold the chain against displacement. The retaining pin 12, which has been moved to one side against the tension of the spring 17 to allow a link of the chain 11 to pass between the arms 7 and 8, may be released, allowing it to assume its normal position as indicated in Figure 4. The purpose of the pin 12 is to merely prevent the chain 11 from moving out of engagement with the arms 7 and 8.

A plurality of sections of chains 6 provides a positive frictional contact between the tire and the ground. This is desirable when driving upon slippery streets. Furthermore, the positive frictional contact enables the driver to withdraw the wheel from a rut or a mud hole. The strain is upon the chain 11 and the arms 7 and 8, but is not upon the pin 12. The device may be readily removed from a tire and a wheel by moving the pin 12 outwardly against the spring 17 so as to permit the free end of the chain 11 to pass freely from between the arms 7 and 8. The device may then be formed in a compact form and placed within an automobile.

I claim:

1. A device of the type described comprising a retaining member, a friction member having one end secured to said retaining member, a flexible securing member, means for securing said friction member to one end of said securing member, arms disposed upon said retaining member at spaced-apart positions and arranged to receive said securing member therebetween, and means carried by said arms for holding said securing member against displacement.

2. A device of the type described comprising a retaining member, a friction member having one end secured to said retaining member, a flexible member, means for securing the other end of said friction member to one end of said flexible member, and arms carried by said retaining member and disposed at spaced-apart positions, said flexible member being adapted to be disposed between said arms, said arms being formed so as to firmly hold said flexible member against displacement.

3. A device of the type described comprising a retaining member, a friction member having one end secured to said retaining member, a flexible member, means for securing the other end of said friction member to one end of said flexible member, arms carried by said retaining member and disposed at spaced-apart positions, said flexible member being adapted to be disposed between said arms, said arms being formed so as to firmly hold said flexible member against displacement, and means carried by said arms for holding said flexible member in engagement with said arms.

4. A device of the type described comprising a retaining member, a friction member having one end secured to said retaining member, a flexible member, means for securing the other end of said friction member to one end of said flexible member, arms carried by said retaining member and disposed at spaced-apart positions, said flexible member being adapted to be disposed between said arms, said arms being formed so as to firmly hold said flexible member against displacement, and means carried by said arms for holding said flexible member in engagement with said arms, said last-named means comprising a retaining pin movably carried by said arms and arranged to be moved whereby said flexible member may be removed from said arms.

5. A device of the type described comprising a retaining member, a friction member having one end secured to said retaining member, a flexible member, means for securing the other end of said friction member to one end of said flexible member, arms carried by said retaining member and disposed at spaced-apart positions, said flexible member being adapted to be disposed between said arms, said arms being formed so as to firmly hold said flexible member against displacement, means carried by said arms for holding said flexible member in engagement with said arms, said last-named means comprising a retaining pin movably carried by said arms and arranged to be moved whereby said flexible member may be removed from said arms, and means for holding said pin normally in closed position.

Signed at Chicago, in the county of Cook, and State of Illinois, this 3rd day of February, A. D. 1928.

JOHN C. SHELLER.